United States Patent
Zhang et al.

(10) Patent No.: US 11,647,391 B2
(45) Date of Patent: May 9, 2023

(54) SECURITY PROTECTION METHOD, DEVICE, AND SYSTEM

(71) Applicant: HUAWEI TECHNOLOGIES CO., LTD., Guangdong (CN)

(72) Inventors: Bo Zhang, Shenzhen (CN); Chengdong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 17/180,228

(22) Filed: Feb. 19, 2021

(65) Prior Publication Data

US 2021/0185538 A1 Jun. 17, 2021

Related U.S. Application Data

(63) Continuation of application No. PCT/CN2019/101936, filed on Aug. 22, 2019.

(30) Foreign Application Priority Data

Sep. 15, 2018 (CN) .......................... 201811077527.9

(51) Int. Cl.
*H04L 29/06* (2006.01)
*H04W 12/122* (2021.01)
(Continued)

(52) U.S. Cl.
CPC ........... *H04W 12/122* (2021.01); *H04W 8/08* (2013.01); *H04W 12/08* (2013.01); *H04W 12/37* (2021.01)

(58) Field of Classification Search
CPC ............................. H04L 63/105; H04L 63/20
See application file for complete search history.

(56) References Cited

U.S. PATENT DOCUMENTS 8,146,160 B2 * 3/2012 Orr .......................... H04L 63/08
713/168
9,516,501 B2 12/2016 Grech et al.
(Continued)

FOREIGN PATENT DOCUMENTS

CN 101686233 A 3/2010
CN 102118810 A 7/2011
(Continued)

OTHER PUBLICATIONS

Chase et al. "Improving privacy and security in multi-authority attribute-based encryption", CCS '09: Proceedings of the 16th ACM conference on Computer and communications security, Nov. 2009.*
(Continued)

*Primary Examiner* — Morshed Mehedi

(57) ABSTRACT

Embodiments of this application provide a security protection method, a device, and a system, to improve data transmission security. The method includes: determining, by a terminal, a session management network element, or a mobility management network element, whether a security protection policy determined by an access network device is consistent with a user plane security policy delivered by the session management network element to the access network device; and if the security protection policy determined by the access network device is inconsistent with the user plane security policy delivered by the session management network element to the access network device, performing processing according to a preset policy.

21 Claims, 5 Drawing Sheets

(51) Int. Cl.
*H04W 12/37* (2021.01)
*H04W 8/08* (2009.01)
*H04W 12/08* (2021.01)

(56) References Cited

U.S. PATENT DOCUMENTS

| | | | |
|---|---|---|---|
| 10,484,911 B1* | 11/2019 | Bogineni | H04W 76/10 |
| 2009/0217353 A1* | 8/2009 | Zheng | H04L 63/101 707/999.1 |
| 2009/0252134 A1* | 10/2009 | Schlicht | H04L 1/0015 709/205 |
| 2014/0051394 A1 | 2/2014 | Grech et al. | |
| 2016/0191567 A1* | 6/2016 | Chahal | G06F 21/44 726/1 |
| 2018/0317157 A1* | 11/2018 | Baek | H04W 48/18 |
| 2019/0082325 A1* | 3/2019 | Muhanna | H04L 9/3242 |

FOREIGN PATENT DOCUMENTS

| | | |
|---|---|---|
| CN | 104683981 A | 6/2015 |
| EP | 2503754 A1 | 9/2012 |
| WO | 2006/001590 A1 | 1/2006 |
| WO | WO-2010127578 A1 * 11/2010 | ............. H04L 63/08 |
| WO | WO-2017143611 A1 * 8/2017 | ......... H04L 12/4641 |

OTHER PUBLICATIONS

CATT, "Clarification on UP security policy verification", 3GPP TSG-SA WG3 Meeting #92 S3-182229, Dalian (China), Aug. 20-24, 2018, total 3 pages.
3GPP TR 33.899 V1.0.0 (Mar. 2017); 3rd Generation Partnership Project; Technical Specification Group Services and System Aspects; Study on the security aspects of the next generation system (Release 14); total 471 pages.
Extended European Search Report issued in EP 19859166.1, dated Aug. 6, 2021, total 9 pages.
3GPP TS 33.501 V15.1.0: 3rd Generation Partnership Project; Technical Specification Group Services and System Aspects; Security architecture and procedures for 5G system (Release 15), Jun. 2018, 152 pages.
International Search Report and Written Opinion for PCT/CN2019/ 101936 dated Sep. 30, 2019, 10 pages, with English Translation.
Chinese Office Action for 201811077527.9 dated Jul. 10, 2020, 6 pages.

* cited by examiner

SECURITY PROTECTION METHOD, DEVICE, AND SYSTEM

CROSS-REFERENCE TO RELATED APPLICATIONS

This application is a continuation of International Application No. PCT/CN2019/101936, filed on Aug. 22, 2019, which claims priority to Chinese Patent Application No. 201811077527.9, filed on Sep. 15, 2018. The disclosures of the aforementioned applications are hereby incorporated by reference in their entireties.

TECHNICAL FIELD

This application relates to the field of communications technologies, and in particular, to a security protection method, a device, and a system.

BACKGROUND

In an existing mobile communications security architecture, a terminal and a base station may enforce user plane data protection (for example, confidentiality protection and/ or integrity protection) based on a user plane security policy. For example, a core network device may determine a user plane security policy, and deliver the user plane security policy to the base station. After receiving the user plane security policy, the base station determines a protection mode used when air interface transmission is performed between the base station and the terminal, and notifies the terminal of the protection mode, so that the base station and the terminal transmits user plane data to each other in the same protection mode.

However, in an actual application, there is a scenario that, after the base station is maliciously attacked, the user plane security policy received by the base station may be tampered with, and the base station may determine, based on a changed user plane security policy, not to enforce data protection, or a malicious base station incorrectly executes content of the user plane security policy, and the base station does not report the determined result to the core network device. Consequently, the core network device and the terminal are unaware of a change of the protection mode, and do not correct the malicious behavior, and data transmission security is affected.

SUMMARY

Embodiments of this application provide a security protection method, a device, and a system, to improve data transmission security.

To achieve the foregoing objective, the embodiments of this application provide the following technical solutions.

According to a first aspect, an embodiment of this application provides a security protection method. The method includes: A first device obtains indication information used to indicate a security protection policy determined by an access network device, and determines whether the security protection policy determined by the access network device is consistent with a user plane security policy. If the security protection policy determined by the access network device is inconsistent with the user plane security policy, the first device performs processing according to a preset policy.

The first device may be a terminal, a session management network element, or a mobility management network element.

According to the method provided in the first aspect, the terminal, the session management network element, or the mobility management network element determines the security protection policy determined by the access network device, and if the security protection policy determined by the access network device is inconsistent with the user plane security policy, performs processing according to the preset policy, to improve subsequent data transmission security.

With reference to the first aspect, in a first possible implementation of the first aspect, the first device is a terminal. That the first device performs processing according to a preset policy includes: The first device reports a determined result to a core network element. Alternatively, the first device requests a session management network element to re-deliver the user plane security policy to the access network device.

In this case, when determining that the security protection policy determined by the access network device is inconsistent with the user plane security policy, the terminal may send the determined result to the core network device for processing, and the core network device releases a protocol data unit (PDU) session or the like based on the determined result. Alternatively, the terminal requests the session management network element to re-deliver the user plane security policy.

In a second possible implementation of the first aspect, the method further includes: The terminal receives the user plane security policy sent by the session management network element by using the mobility management network element.

The session management network element may send the user plane security policy to the terminal in an existing PDU session establishment procedure. In this case, the terminal may determine, based on the received user plane security policy, whether the security protection policy determined by the access network device is correct.

In a third possible implementation of the first aspect, the first device is a session management network element. That a first device obtains indication information includes: The first device receives the indication information from a terminal.

The first device may receive the indication information sent by the terminal by using the access network device and a mobility management network element. Alternatively, the first device may receive the indication information sent by the terminal by using a mobility management network element. In this case, the session management network element may determine, based on the received user plane security policy, whether the security protection policy determined by the access network device is correct.

In a fourth possible implementation of the first aspect, that the first device performs processing according to a preset policy includes: The first device releases a protocol data unit (PDU) session. Alternatively, the first device resends the user plane security policy to the access network device.

In this case, when it is determined that the security protection policy determined by the access network device is inconsistent with the user plane security policy, the core network device releases the PDU session or the like based on the determined result. Alternatively, the core network device re-delivers the user plane security policy.

According to a second aspect, this application provides a communications apparatus. The communications apparatus may be a terminal, a chip in a terminal, or a system on chip, or may be a session management network element, a chip in a session management network element, or a system on chip. The communications apparatus may implement functions performed by the terminal in the foregoing aspect or the possible implementations, and the functions may be implemented by hardware, or may be implemented by hardware by executing corresponding software. The hardware or the software includes one or more modules corresponding to the foregoing functions. For example, the communications apparatus may include an obtaining unit, a determining unit, and a security processing unit.

The obtaining unit is configured to obtain indication information used to indicate a security protection policy determined by an access network device.

The determining unit is configured to determine whether the security protection policy determined by the access network device is consistent with a user plane security policy.

The security processing unit is configured to: if the security protection policy determined by the access network device is inconsistent with the user plane security policy, perform processing according to a preset policy.

For a specific implementation of the communications apparatus, refer to behavior functions of the first device in the security protection method provided in any one of the first aspect or the possible implementations of the first aspect. Therefore, the provided communications apparatus can achieve same beneficial effects as any one of the first aspect or the possible implementations of the first aspect.

According to a third aspect, a communications apparatus is provided. The communications apparatus includes a processor and a memory. The memory is configured to store one or more computer-executable instructions. When the communications apparatus runs, the processor executes the one or more computer-executable instructions stored in the memory, so that the communications apparatus performs the security protection method in any one of the first aspect or the possible implementations of the first aspect.

According to a fourth aspect, a computer-readable storage medium is provided. The computer-readable storage medium stores one or more instructions. When the one or more instructions are run on a computer, the computer is enabled to perform the security protection method in any one of the first aspect or the possible implementations of the first aspect.

According to a fifth aspect, a computer program product including one or more instructions is provided. When the computer program product is run on a computer, the computer is enabled to perform the security protection method in any one of the first aspect or the possible implementations of the foregoing aspect.

According to a sixth aspect, a chip system is provided. The chip system includes a processor and a communications interface, which are configured to support a communications apparatus in implementing functions in the foregoing aspects. For example, the processor obtains indication information used to indicate a security protection policy determined by an access network device, determines whether the security protection policy determined by the access network device is consistent with a user plane security policy, and if the security protection policy determined by the access network device is inconsistent with the user plane security policy, the processor performs processing according to a preset policy. In a possible implementation, the first parameter corresponds to a user plane transmission logical channel between the first device and a user plane network element. The chip system further includes a memory. The memory is configured to store one or more program instructions and data that are necessary for the communications apparatus. The chip system may include a chip, or may include a chip and another discrete device.

For technical effects achieved by any one of the implementations of the third aspect to the sixth aspect, refer to technical effects achieved by any one of the first aspect or the possible implementations of the first aspect.

According to a seventh aspect, this application provides a security protection system. The system includes the communications apparatus and the access network device in the second aspect to the sixth aspect.

DESCRIPTION OF EMBODIMENTS

Figure 1:
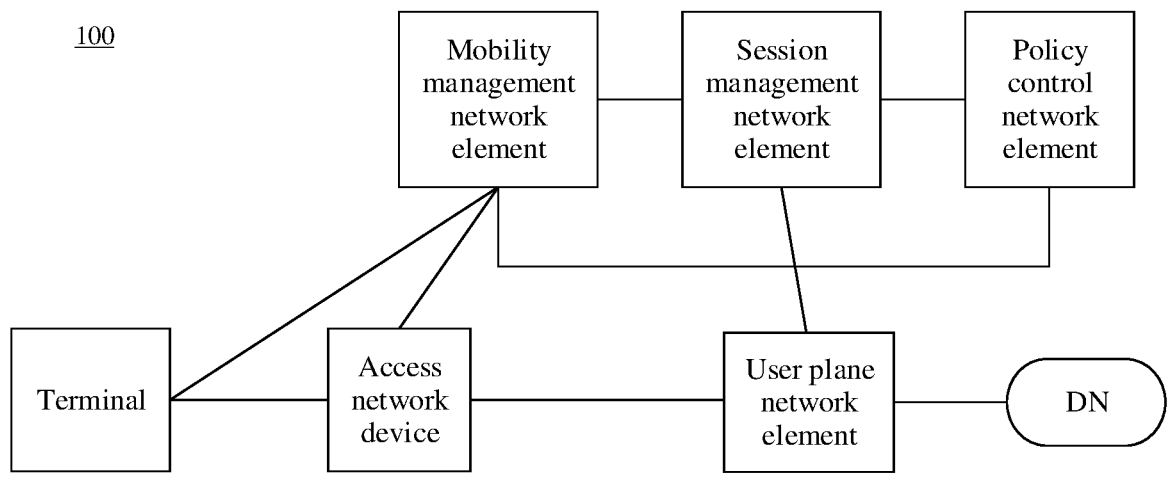
FIG. 1 is a schematic diagram of a system framework according to an embodiment of this application.

First, to facilitate understanding of the embodiments of this application, the following describes terms in the present disclosure.

A user plane security policy (UP security policy) may be referred to as a security indication, and is mainly used to specify whether data protection needs to be enforced on data transmitted on a protocol data unit (PDU) session, data transmitted on a data radio bearer (DRB), or data belonging to a quality of service flow (QoS flow). Data protection may include but is not limited to any one or more of the following protection modes: confidentiality protection and integrity protection. For example, data protection may include confidentiality protection, or integrity protection, or both confidentiality protection and integrity protection.

For example, a user plane security policy may be preconfigured and stored in a core network element (for example, a session management network element), or a core network element determines a user plane security policy in a session establishment procedure based on information received by the core network element and information preconfigured in the core network element. A manner of determining a user plane security policy is not limited in the embodiments of this application. The user plane security policy may include an integrity protection indication and/or a confidentiality protection indication. The integrity protection indication may be used to indicate an integrity protection requirement for data. The integrity protection requirement may be any one of the following requirements: protection is required, protection is preferred, and protection is not needed. The confidentiality protection indication may be used to indicate a confidentiality requirement for data. The confidentiality requirement may be any one of the following requirements: protection is required, protection is preferred, and protection is not needed. In addition, the user plane security policy may further include an encryption key length (for example, it is specified that an encryption key length during confidentiality protection is 256 bits and/or a protection key length during integrity protection is 256 bits), a key update time, and the like. It should be noted that, in the embodiments of this application, "and/or" describes only an association relationship for describing associated objects and represents that three relationships may exist. For example, the integrity protection indication and/or the confidentiality protection indication may represent the following three cases: Only the integrity protection indication exists, both the integrity protection indication and the confidentiality protection indication exist, and only the confidentiality protection indication exists.

The user plane security policy may correspond to one or more PDU sessions, and is used to represent whether data protection needs to be enforced on data transmitted on the one or more PDU sessions. Alternatively, the user plane security policy may correspond to one or more DRBs (or signaling radio bearers (SRB)), and is used to represent whether data protection needs to be enforced on data transmitted on the one or more DRBs. Alternatively, the user plane security policy may correspond to one or more QoS flows, and is used to represent whether data protection needs to be enforced on data belonging to any one of the QoS flows. In addition, the user plane security policy may alternatively correspond to an N3 tunnel identifier, a slice identifier, or the like. This is not limited in embodiments of the present disclosure. In the embodiments of this application, the N3 tunnel identifier may also be described as a channel identifier or a logical channel identifier.

For example, Table 1 shows a user plane security policy corresponding to a PDU session 1. As shown in Table 1, the user plane security policy includes a confidentiality protection indication and an integrity protection indication. The confidentiality protection indication corresponds to "required", and the integrity protection indication corresponds to "not need". Therefore, it may be determined, based on Table 1, that confidentiality protection needs to be enforced on data transmitted on the PDU session 1, and integrity protection does not need to be enforced on the data.

TABLE 1

|  | Required | Preferred | Not need |
| --- | --- | --- | --- |
| Confidentiality protection indication | ✓ |  |  |
| Integrity protection indication |  |  | ✓ |

Confidentiality protection is to encrypt some data to achieve a data hiding effect. After receiving the encrypted data, a receive end may restore original data through decryption. For example, a transmit end may input a bearer (radio bearer ID), an encryption key, a count, a direction (uplink data or downlink data), and a length parameter (keystream length) into a security algorithm (for example, an NEA function), to obtain a keystream block, and perform an exclusive OR operation on a plaintext and the keystream block to obtain a ciphertext block and then send the ciphertext block. After receiving the ciphertext block, the receive end inputs a bearer, a key, a count, a direction (uplink data or downlink data), and a length into a security algorithm (for example, an NEA function), to obtain a keystream block, and performs an exclusive OR operation on the ciphertext block and the keystream block to obtain a plaintext.

Integrity protection is to enforce integrity protection on data, and check, based on a message authentication code (MAC), whether the data is tampered with. For example, a transmit end inputs a series of parameters such as a key, a count, a bearer, a direction, and a plaintext into an NIA function, to obtain a MAC and then send the MAC. After receiving the plaintext and the MAC, a receive end performs calculation again based on the foregoing series of parameters, to obtain a MAC, and determines whether the received MAC is the same as the MAC obtained through calculation. If the received MAC is the same as the MAC obtained through calculation, the check succeeds, and the data is not tampered with.

The following describes the technical solutions in the embodiments of this application with reference to the accompanying drawings in this application.

A security protection method provided in the embodiments of this application may be applied to a network system 100 shown in FIG. 1. The network system may be a long term evolution (LTE) system, or may be a 5th generation (5G) system, or may be a new radio (NR) system or another system. This is not limited in embodiments of the present disclosure. As shown in FIG. 1, the network system 100 may include a terminal, an access network device, a mobility management network element, a session management network element, a user plane network element, and a data network (DN). The mobility management network element, the session management network element, and the user plane network element are located in a core network of the network system 100. It should be noted that FIG. 1 is merely an example of an architectural diagram. In addition to the function units shown in FIG. 1, the network system 100 may further include a management network element (for example, a unified data management (UDM) network element), an operation and management (O&M) network element, another network element, and the like. This is not limited in the embodiments of this application.

The terminal in FIG. 1 may be configured to connect to the access network device through a radio air interface (for example, a DRB or an RB) between the terminal and the access network device, to connect to the core network by using the access network device, or may be configured to connect to the access network device through a wired connection (for example, a cable or an optical fiber). In this embodiment of this application, an example in which the terminal communicates with the access network device through the radio air interface is used for description. For example, the terminal may be user equipment (UE) such as a mobile phone or a computer, or may be a cellular phone, a cordless phone, a session initiation protocol (SIP) phone, a smart phone, a wireless local loop (WLL) station, a personal digital assistant (PDA), a computer, a laptop computer, a handheld communications device, a handheld computing device, a satellite wireless device, a wireless modem card, a TV set-top box (STB), customer-premises equipment (CPE), and/or another device that can communicate with the access network device. In addition to establishing a connection to the access network device and communicating with the access network device, the terminal may further communicate with the mobility management network element in the core network through a next generation (NG) (N for short) interface—N1 interface.

The access network device is mainly configured to implement functions such as a physical layer function, resource scheduling and management, terminal access control, and mobility management. The access network device may be a device that supports wired access, or may be a device that supports wireless access. For example, the access network device may be an access network (AN)/a radio access network (RAN), and includes a plurality of 5G-AN/5G-

RAN nodes. The 5G-AN/5G-RAN node may be an access point (AP), a base station (nodeB, NB), an enhanced base station (eNB), a next generation base station (gNB), a transmission reception point (TRP), a transmission point (TP), or another access node. In addition to establishing a connection to the terminal and communicating with the terminal, the access network device may further communicate with the mobility management network element through an N2 interface, and communicate with the user plane network element through an N3 interface (or referred to as an N3 link) to transmit user plane data.

The mobility management network element may be an access and mobility management function (AMF), and is mainly configured to manage mobility of the terminal. For example, the mobility management network element may communicate with the session management network element through an N11 interface.

The session management network element may be a session management function (SMF), and is mainly configured to manage one or more user plane network elements, to implement functions such as establishment, release, and modification of a user plane transmission logical channel (for example, a protocol data unit (PDU) session). For example, the session management network element may communicate with the user plane network element through an N4 interface.

The user plane network element may be a user plane function (UPF). The user plane network element may be used as an anchor on the user plane transmission logical channel, and is mainly configured to complete functions such as routing and forwarding of the user plane data, for example, establishing a channel (that is, the user plane transmission logical channel) with the terminal, forwarding a data packet between the terminal and the DN on the channel, and being responsible for filtering of a data packet of the terminal, data transmission/forwarding, rate control, and charging information generation.

The DN may include a network device (a device such as a server or a router), and is mainly configured to provide a plurality of data services for the terminal.

In the system shown in FIG. 1, the session management network element may send a user plane security policy to the access network device by using the mobility management network element. After receiving the user plane security policy, the access network device may determine, based on the user plane security policy, a security protection policy corresponding to data (referred to as user plane data in this embodiment of this application) transmitted on an air interface, and send, to the terminal, first indication information used to indicate the security protection policy, so that the terminal enforces data protection based on the security protection policy determined by the access network device. In addition, to avoid a problem that the security protection policy determined by the access network device is inconsistent with the user plane security policy because the user plane security policy is tampered with or the access network device maliciously refuses to execute a protection mode specified in the user plane security policy, an implementation is as follows: The terminal may send, to the mobility management network element or the session management network element, second indication information used to indicate a security protection policy, so that the mobility management network element or the session management network element compares the user plane security policy with the security protection policy indicated by the second indication information. If the user plane security policy is inconsistent with the security protection policy indicated by the second indication information, it indicates that the user plane security policy received by the access network device may be tampered with or the RAN may maliciously refuse to enforce data protection. In this case, the terminal may release a PDU session, report a notification message to another network element, re-deliver the user plane security policy, or the like. Specifically, for the implementation, refer to FIG. 3 and FIG. 4.

Another implementation is as follows: The terminal may obtain the user plane security policy, and compare the user plane security policy with the security protection policy indicated by the first indication information. If the user plane security policy is inconsistent with the security protection policy indicated by the first indication information, it indicates that the user plane security policy received by the access network device may be tampered with or the RAN may maliciously refuse to enforce data protection. In this case, the terminal may release a PDU session, report a notification message to another network element, request a core network element to re-deliver the user plane security policy, or the like. Specifically, for the other implementation, refer to FIG. 5.

It should be noted that the network elements, the names of the network elements, and the names of the parameters in the network system 100 in FIG. 1 are merely examples. During specific implementations, the network elements, the names of the network elements, and the names of the parameters may have other names. This is not specifically limited in embodiments of this application.

Figure 2:
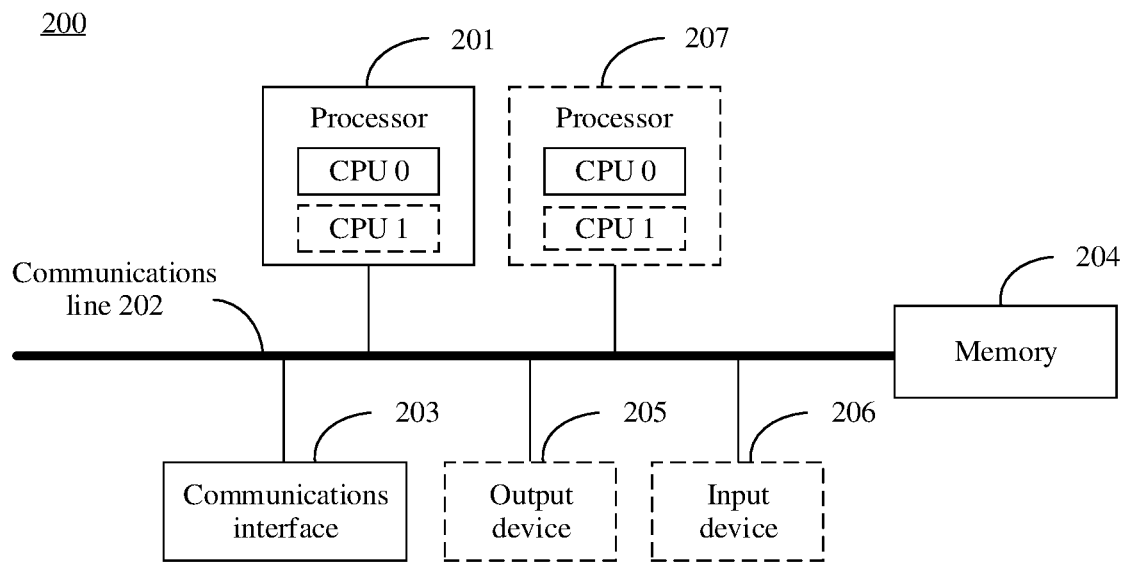
FIG. 2 is a schematic block diagram of a communications apparatus according to an embodiment of this application.

The terminal, the session management network element, and the mobility management network element in FIG. 1 may include components shown in FIG. 2. FIG. 2 is a schematic block diagram of a communications apparatus 200 according to an embodiment of this application. The communications apparatus 200 is configured to implement the security protection method provided in the embodiments of this application. As shown in FIG. 2, the communications apparatus 200 includes at least one processor 201, a communications line 202, and at least one communications interface 203. The communications apparatus 200 may further include a memory 204. The processor 201, the memory 204, and the communications interface 203 may be connected to each other through the communications line 202. In this embodiment of this application, "at least one" may be one, two, three, or more. This is not limited in embodiments of this application.

In this embodiment of this application, the processor 201 may be a central processing unit (CPU), a general-purpose processor, a network processor (NP), a digital signal processor (DSP), a microprocessor, a microcontroller, a programmable logic device (PLD), or any combination thereof. The processor may alternatively be any other apparatus with a processing function, for example, a circuit, a device, or a software module.

In this embodiment of this application, the communications line 202 may include a path, configured to transmit information between the components included in the communications apparatus.

In this embodiment of this application, the communications interface 203 is configured to communicate with another device or communications network (such as Ethernet, a radio access network (RAN), or a wireless local area network (WLAN)). The communications interface 203 may be a module, a circuit, a transceiver, or any apparatus that can implement communication.

In this embodiment of this application, the memory 204 may be a read-only memory (ROM) or another type of static storage device that can store static information and/or an instruction, or a random access memory (RAM) or another type of dynamic storage device that can store information and/or instructions. Alternatively, the memory 204 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory 204 is not limited thereto.

In a possible implementation, the memory 204 may be independent of the processor 201, that is, the memory 204 may be a memory outside the processor 201. In this case, the memory 204 may connect to the processor 201 through the communications line 202, and is configured to store instructions or program code. When invoking and executing the instructions or the program code stored in the memory 204, the processor 201 can implement the security protection method provided in the following embodiments of this application. In another possible implementation, the memory 204 may alternatively be integrated with the processor 201, that is, the memory 204 may be a memory inside the processor 201. For example, the memory 204 is a cache, and may be configured to temporarily store some data and/or instruction information.

In an implementation, the processor 201 may include one or more CPUs, for example, a CPU 0 and a CPU 1 in FIG. 2. In another implementation, the communications device 200 may include a plurality of processors, for example, the processor 201 and a processor 207 in FIG. 2. In still another implementation, the communications device 200 may further include an output device 205 and an input device 206. For example, the input device 206 may be a device such as a keyboard, a mouse, a microphone, or a joystick. The output device 205 may be a device such as a display or a speaker.

It should be noted that the communications apparatus 200 may be a general-purpose device or a dedicated device. For example, the communications apparatus 200 may be a desktop computer, a portable computer, a network server, a PDA, a mobile phone, a tablet computer, a wireless terminal, an embedded device, a chip system, or a device with a structure similar to that in FIG. 2. A type of the communications apparatus 200 is not limited in embodiments of this application. In embodiments of this application, the chip system may include a chip, or may include a chip and another discrete device.

With reference to FIG. 1, the following specifically describes the security protection method provided in the embodiments of this application by using an example in which the user plane network element is the UPF, the access network device is the RAN, the session management network element is the SMF, the mobility management network element is the AMF, and the user plane security policy corresponds to the PDU session. It should be noted that names of messages between network elements, names of parameters in the messages, or the like in the following embodiments of this application are merely examples, and may have other names during specific implementation. This is not limited in embodiments of the present disclosure. Terms such as "first" and "second" in the embodiments of this application are used to distinguish between different objects, but are not used to describe a specific sequence of the objects. Attributes of different objects represented by "first" and "second" are not limited in the embodiments of this application. For example, first indication information and second indication information in the embodiments of this application are different objects in terms of names, but both the first indication information and the second indication information may be used to indicate a security protection policy determined by the RAN. In other words, the first indication information and the second indication information are essentially same indication information used to indicate the security protection policy determined by the RAN. In the embodiments of this application, the word "example" or "for example" is used to represent giving an example, an illustration, or a description. Any embodiment or implementation described as an "example" or "for example" in the embodiments of this application should not be explained as being more preferred or having more advantages than another embodiment or implementation. Exactly, usage of the word "example" or "for example" is intended to present a related concept in a specific manner for ease of understanding.

Figure 3:
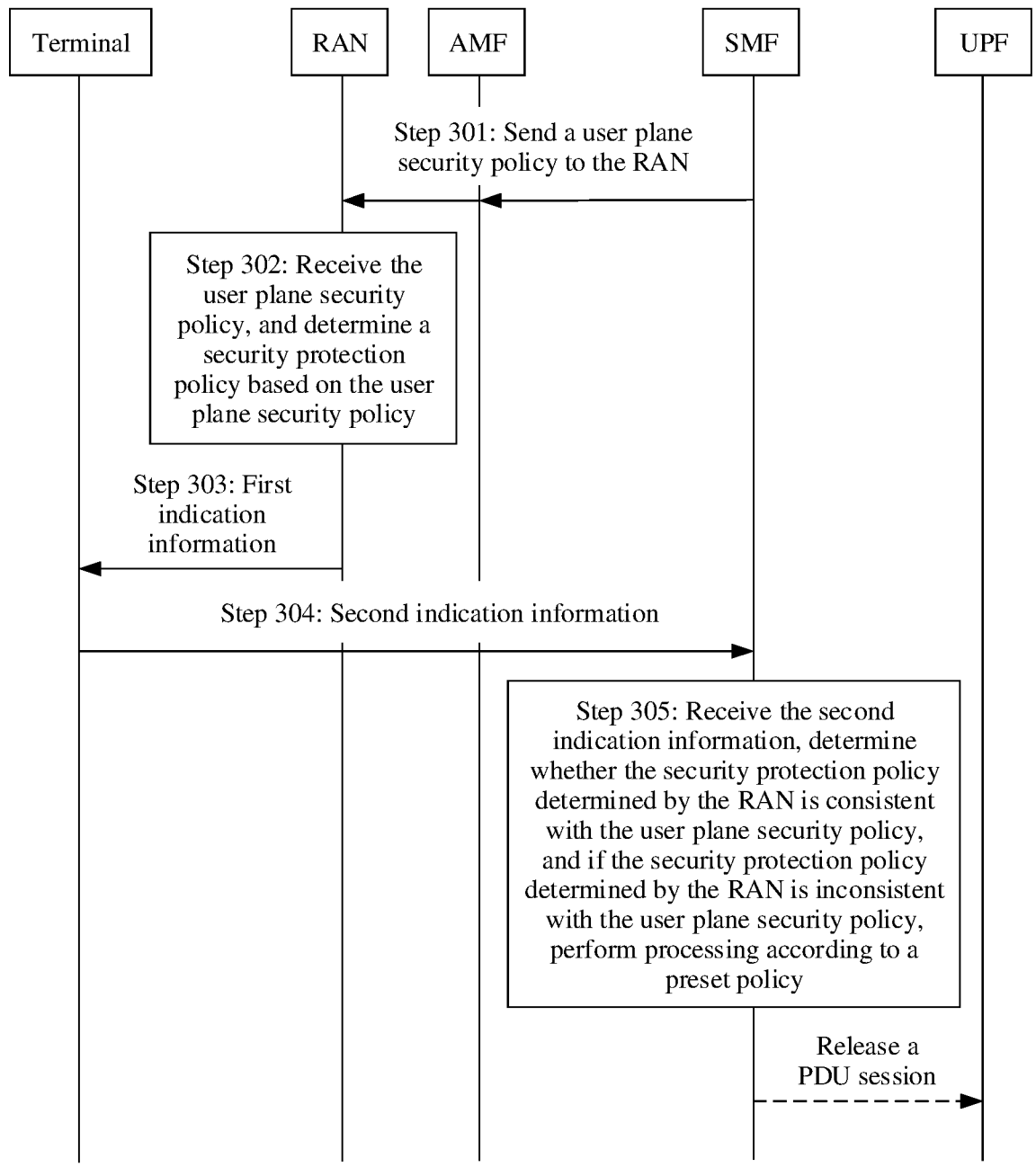
FIG. 3 is a flowchart of a security protection method according to an embodiment of this application.

FIG. 3 shows a security protection method according to an embodiment of this application. As shown in FIG. 3, the method may include the following steps.

Step 301: An SMF sends a user plane security policy to a RAN.

Related descriptions of the user plane security policy are described above.

Optionally, before the SMF sends the user plane security policy to the RAN, a terminal may send, to an AMF, a session establishment request used to request to establish a PDU session. After receiving the session establishment request, the AMF may send a session management (SM) context establishment request to the SMF. After receiving the SM context establishment request, the SMF may obtain the user plane security policy, and send the user plane security policy to the RAN. That the SMF sends the user plane security policy to the RAN may include: The SMF sends the user plane security policy to the AMF, and after receiving the user plane security policy, the AMF sends the user plane security policy to the RAN. The user plane security policy sent by the SMF to the AMF may be included in an SM context response corresponding to the SM context establishment request, and the user plane security policy sent by the AMF to the RAN may be included in an N2 message. It should be noted that, in a process in which the SMF sends the user plane security policy to the RAN, or before the SMF sends the user plane security policy to the RAN, or after the SMF sends the user plane security policy to the RAN, the AMF may receive the user plane security policy from the SMF, and store the received user plane security policy in the AMF.

For example, the user plane security policy may be prestored in the SMF or another device. When the user plane security policy is stored in the SMF, after receiving the SM context establishment request, the SMF may obtain the user plane security policy stored within it. When the user plane security policy is stored in the other device, the SMF may obtain the user plane security policy from the other device. For example, the SMF may send an obtaining request to the other device that stores the user plane security policy, and receive the user plane security policy sent by the other device. Alternatively, after receiving the SM context establishment request, the SMF determines the user plane security policy based on information about the established PDU session or other information. A manner of determining the user plane security policy is not limited in this embodiment of this application.

Optionally, if the user plane security policy corresponds to the PDU session, in step 301, when sending the user plane security policy to the AMF, the SMF may further send a PDU session identifier (ID) to the AMF. The PDU session ID is used to identify the PDU session corresponding to the user plane security policy, so that the AMF determines, based on the PDU session ID, that the received user plane security policy corresponds to the PDU session, that is, the user plane security policy is applicable to the PDU session.

Optionally, when sending the user plane security policy to the RAN by using the AMF, the SMF may also send the PDU session ID to the RAN, so that the RAN determines, based on the PDU session ID, that the received user plane security policy corresponds to the PDU session, that is, the user plane security policy is applicable to the PDU session.

Step 302: The RAN receives the user plane security policy, and determines a security protection policy based on the user plane security policy.

The security protection policy may also be described as a user plane (UP) security protection policy, and may be used to specify whether confidentiality protection, integrity protection, or confidentiality protection and integrity protection are enforced on data transmitted between the terminal and the RAN. The security protection policy may include a first integrity protection indication and/or a first confidentiality protection indication. The first integrity protection indication may be used to indicate whether integrity protection is enforced. For example, the first integrity protection indication may correspond to two states: "enforce" and "not enforce". Similarly, the first confidentiality protection indication may be used to indicate whether confidentiality protection is enforced. For example, the first confidentiality protection indication may correspond to two states: "enforce" and "not enforce". In addition, the security protection policy may further include an encryption key length, a key update time, and the like.

In an actual application, the RAN is vulnerable to malicious attacks. The user plane security policy stored in the RAN may be tampered with, so that the RAN determines, based on a changed user plane security policy, a security protection policy for the data transmitted between the terminal and the RAN. This violates the specification of the user plane security policy delivered by the SMF. Alternatively, the RAN maliciously (or intentionally) refuses to enforce data protection according to the user plane security policy. For example, if an integrity protection indication corresponds to "required", the first integrity protection indication corresponds to "not enforce". In these cases, that the RAN determines a security protection policy based on the user plane security policy may include: The RAN determines the first integrity protection indication based on the integrity protection indication included in the (changed) user plane security policy, and determines the first confidentiality protection indication based on a confidentiality indication included in the (changed) user plane security policy. For example, if the integrity protection indication corresponds to "required", the first integrity protection indication may correspond to "not enforce". If the integrity protection indication corresponds to "not need", the first integrity protection indication may correspond to "enforce". If the integrity protection indication corresponds to "preferred", the first integrity protection indication may correspond to "enforce", "not enforce", or the like. Similarly, a manner of determining the first confidentiality protection indication based on the confidentiality indication included in the user plane security policy is similar.

An example in which the user plane security policy is tampered with is used. For example, it is assumed that the user plane security policy delivered by the SMF is shown in Table 1, and the user plane security policy in Table 1 may be changed into a user plane security policy shown in Table 2 after being maliciously tampered with. In this case, a security protection policy determined by the RAN based on the user plane security policy shown in Table 2 may be shown in Table 3, and includes a first confidentiality protection indication and a first integrity protection indication. The first confidentiality protection indication corresponds to "not enforce", and the first integrity protection indication corresponds to "not enforce". In other words, the security protection policy determined by the RAN is that confidentiality protection and integrity protection are not enforced on data transmitted on a PDU session 1. This violates the specification of the user plane security policy delivered by the SMF.

TABLE 2

|  | Required | Preferred | Not need |
|---|---|---|---|
| Confidentiality protection indication |  |  | ✓ |
| Integrity protection indication |  |  | ✓ |

TABLE 3

|  | Enforce | Not enforce |
|---|---|---|
| First confidentiality protection indication |  | ✓ |
| First integrity protection indication |  | ✓ |

Step 303: The RAN sends first indication information to the terminal.

The first indication information may be used to indicate the security protection policy determined by the RAN. The first indication information may include the first integrity protection indication and/or the first confidentiality protection indication. In other words, the first indication information includes the indication included in the security protection policy. Optionally, the RAN may send a radio resource control (RRC) message including the first indication information including the first integrity protection indication and/or the first confidentiality protection indication to the terminal.

Optionally, to reduce signaling overheads, identifiers A and B may be used to represent confidentiality protection and integrity protection. For example, A may represent confidentiality protection, and B may represent integrity protection. Binary digits may be used to represent "enforce" and "not enforce". For example, a binary digit "0" may be used to represent that protection is not enforced, and a binary digit "1" may be used to represent that protection is enforced.

For example, the security protection policy includes the first integrity protection indication, the integrity protection indication corresponds to "not enforce", and the security protection policy is used to indicate that integrity protection is not enforced on the data transmitted between the terminal and the RAN. The security protection policy may include B and the binary digit "0". The first indication information sent by the RAN to the terminal may also include the letter B and the binary digit "0", to represent that integrity protection is not enforced.

Optionally, if the RAN further receives the PDU session ID in addition to the user plane security policy, the RAN may further send the PDU session ID to the terminal in addition to the first indication information, so that the terminal determines, based on the PDU session ID, that the first indication information is related to the PDU session identified by the PDU session ID, that is, the security protection policy indicated by the first indication information is used to specify whether data protection is enforced on data transmitted on the PDU session.

Step 304: The terminal receives the first indication information, and sends second indication information to the SMF.

The second indication information may be determined based on the first indication information. The second indication information may also be used to indicate the security protection policy determined by the RAN. The second indication information may include a second integrity protection indication and/or a second confidentiality protection indication. Content indicated by the second integrity protection indication is the same as that indicated by the first integrity protection indication, and both the second integrity protection indication and the first integrity protection indication indicate whether integrity protection is enforced on the data transmitted between the terminal and the RAN. A state ("enforce" or "not enforce") corresponding to the second integrity protection indication is the same as that corresponding to the first integrity protection indication. For example, if the first integrity protection indication is used to indicate that data protection is enforced, the second integrity protection indication is also used to indicate that data protection enforced. Content indicated by the second confidentiality protection indication is the same as that indicated by the first confidentiality protection indication, and both the second confidentiality protection indication and the first integrity protection indication indicate whether confidentiality protection is enforced on the data transmitted between the terminal and the RAN. A state ("enforce" or "not enforce") corresponding to the second confidentiality protection indication is the same as that corresponding to the first confidentiality protection indication. However, a representation manner of the second indication information may be the same as or different from the representation manner of the first indication information. For example, in the first indication information, the identifiers A and B may be used to represent confidentiality protection and integrity protection, and the binary digits "0" and "1" are used to represent "not enforce" and "enforce". In the second indication information, identifiers C and D may be used to represent confidentiality protection and integrity protection, and Boolean values "false" and "true" are used to represent "not enforce" and "enforce". For example, it is assumed that the first indication information includes the letter B and the binary digit "0", to represent that integrity protection is not enforced. In this case, the second indication information may include the letter "D" and the Boolean value "false".

Optionally, the terminal sends the second indication information to the SMF by using the AMF. For example, the terminal may send an N1 message including the second indication information to the AMF, to indicate the AMF to send the second indication information to the SMF. After receiving the N1 message, the AMF obtains the second indication information, and sends an N11 message including the second indication information to the SMF.

Alternatively, the terminal sends the second indication information to the SMF by using the RAN and the AMF. For example, the terminal sends the second indication message to the RAN by using a DRB or an SRB. The RAN sends an N2 message including the second indication information to the AMF. After receiving the N2 message, the AMF obtains the second indication information, and sends an N11 message including the second indication information to the SMF.

Optionally, if the terminal further receives the PDU session ID in addition to the first indication information, the terminal may further send the PDU session ID to the SMF in addition to the second indication information, so that the SMF determines, based on the PDU session ID, that the second indication information is related to the PDU session identified by the PDU session ID, that is, the security protection policy indicated by the second indication information is used to specify whether data protection is enforced on data transmitted on the PDU session.

Step 305: The SMF receives the second indication information, and determines whether the security protection policy determined by the RAN is consistent with the user plane security policy. If the security protection policy determined by the RAN is inconsistent with the user plane security policy, the SMF performs processing according to a preset policy.

That the SMF determines whether the security protection policy determined by the RAN is consistent with the user plane security policy may be further described as follows: The SMF determines whether the second indication information is consistent with the user plane security policy. Alternatively, the SMF determines whether the security protection policy indicated by the second indication information is consistent with the user plane security policy.

Optionally, the SMF may determine, based on the PDU session ID received from the terminal, a user plane security policy corresponding to the PDU session identified by the PDU session ID, and further determine whether the security protection policy indicated by the second indication information is consistent with the user plane security policy corresponding to the PDU session ID.

A method for determining, by the SMF, whether the security protection policy determined by the RAN is consistent with the user plane security policy is as follows: If any one or more of the following cases (1) to (4) occur, it is determined that the security protection policy determined by the RAN is inconsistent with the user plane security policy. If none of the following cases (1) to (4) occurs, it is determined that the security protection policy determined by the RAN is consistent with the user plane security policy. (1) The integrity protection indication in the user plane security policy corresponds to "required", and the second integrity protection indication corresponds to "not enforce". (2) The confidentiality protection indication in the user plane security policy corresponds to "required", and the second confidentiality protection indication corresponds to "not enforce". (3) The integrity protection indication in the user plane security policy corresponds to "not needed", and the second integrity protection indication corresponds to "enforce". (4) The confidentiality protection indication in the user plane security policy corresponds to "not needed", and the second confidentiality protection indication corresponds to "enforce".

It should be noted that, before performing step 305, the SMF may further determine whether the SMF receives a rejection message from the RAN. If the SMF does not receive the rejection message from the RAN, and the SMF determines that the security protection policy determined by the RAN is inconsistent with the user plane security policy, the SMF performs processing (e.g., taking security measures) according to the preset policy.

In this embodiment of this application, the security measures taken by the SMF may include one or more of the following (1) to (3).

(1) Release the PDU session. For example, the SMF may send an N4 session release request to a UPF, to request to release the PDU session, and may send a session release instruction including the PDU session ID to the AMF, to indicate the AMF not to transmit data on the PDU session. Optionally, the SMF sends, to the terminal, a determined result that the security protection policy determined by the RAN is inconsistent with the user plane security policy delivered by the SMF, so that the terminal triggers a PDU session release procedure. Optionally, the SMF sends the determined result to the AMF, so that the AMF triggers a PDU session release procedure.

(2) Report a notification message to another network element. The notification message may be used to indicate that a check on the user plane security policy is abnormal, the RAN may be attacked, or the user plane security policy is tampered with. For example, the SMF may report the notification message to the AMF, a management network element, or an O&M, to notify the network element that a check on the user plane security policy is abnormal, the RAN may be attacked, or the user plane security policy is tampered with.

(3) Trigger a PDU session modification and resend the user plane security policy to the RAN. For example, the SMF may send, to the terminal, a determined result that the security protection policy determined by the RAN is inconsistent with the user plane security policy delivered by the SMF. After receiving the determined result, the terminal may send a PDU session modification request to the AMF. After receiving the PDU session modification request, the AMF may send an SM context modification request to the SMF. After receiving the SM context modification request, the SMF resends the user plane security policy to the RAN, that is, performs step 301 again. Alternatively, the SMF may directly trigger a PDU session modification procedure. Specifically, a manner of triggering the PDU session modification procedure by the SMF is not limited. Optionally, the SMF sends the determined result to the AMF, so that the AMF triggers the PDU session modification. For example, in a new PDU session modification procedure, the AMF sends the user plane security policy stored in the AMF to a gNB.

In addition, optionally, if the security protection policy determined by the RAN is completely consistent with the user plane security policy, the SMF may not perform the above described processing.

According to the method shown in FIG. 3, the terminal may send, to the SMF, the indication information used to indicate the security protection policy determined by the RAN. The SMF determines whether the security protection policy determined by the RAN is consistent with the user plane security policy. When the security protection policy determined by the RAN is inconsistent with the user plane security policy, it indicates that the user plane security policy received by the RAN may be tampered with or the RAN may maliciously refuse to enforce data protection. In this case, the SMF may perform processing according to the preset policy, to improve subsequent data transmission security. In this case, even if the security protection policy determined by the RAN is incorrect, a network-side device can know that, and take a corresponding remedy.

Optionally, in another possible implementation of the method shown in FIG. 3, in step 302, when the user plane security policy received by the RAN is not tampered with or the RAN does not maliciously avoid enforcing data protection, and the confidentiality protection indication and/or the integrity protection indication in the user plane security policy correspond/corresponds to "required", after receiving the user plane security policy, the RAN may determine, with reference to information such as a resource or a capability of the RAN, whether data protection is enforced. If determining that data protection cannot be enforced, the RAN may send a rejection message to the SMF, to notify the SMF not to enforce data protection.

After receiving the rejection message, the SMF may release the PDU session.

Further optionally, after receiving the rejection message, the SMF may further maintain a counter. The counter is used to count a quantity of received rejection messages sent by the RAN. For example, if the SMF receives one rejection message, a count value of the counter is increased by 1. When the count value of the counter maintained by the SMF is greater than or equal to a preset quantity of times, the SMF reports a notification message to another network element. The notification message may be used to notify the network element that the RAN is abnormal, the RAN may be attacked, or the like. For example, the SMF may report the notification message to the AMF, a management network element, or an O&M.

Alternatively, the SMF calculates a rejection frequency of the RAN. If the rejection frequency of the RAN is greater than or equal to a preset frequency, the SMF reports a notification message to another network element. The notification message may be used to indicate that the RAN is abnormal, the RAN may be attacked, or the like. For example, the SMF may report the notification message to the AMF, a management network element, or an O&M.

The preset quantity of times may be set based on a requirement. This is not limited in embodiments of the present disclosure. When the count value of the counter is greater than or equal to the preset quantity of times, it indicates that the RAN is abnormal or the RAN may be attacked. When the count value of the counter is less than the preset quantity of times, it indicates that the RAN is normal.

The rejection frequency may be a quantity of rejection messages sent by the RAN to the SMF per unit of time. The preset frequency may be set based on a requirement. This is not limited in embodiments of the present disclosure. When the rejection frequency of the RAN is greater than or equal to the preset frequency, it indicates that the RAN is abnormal or the RAN may be attacked. When the rejection frequency of the RAN is less than the preset frequency, it indicates that the RAN is normal.

In another feasible solution, the terminal may further send the second indication information to the AMF, so that the AMF determines, based on the second indication information and the user plane security policy, whether the security protection policy determined by the RAN is consistent with the user plane security policy. Specifically, the method is shown in FIG. 4.

Figure 4:
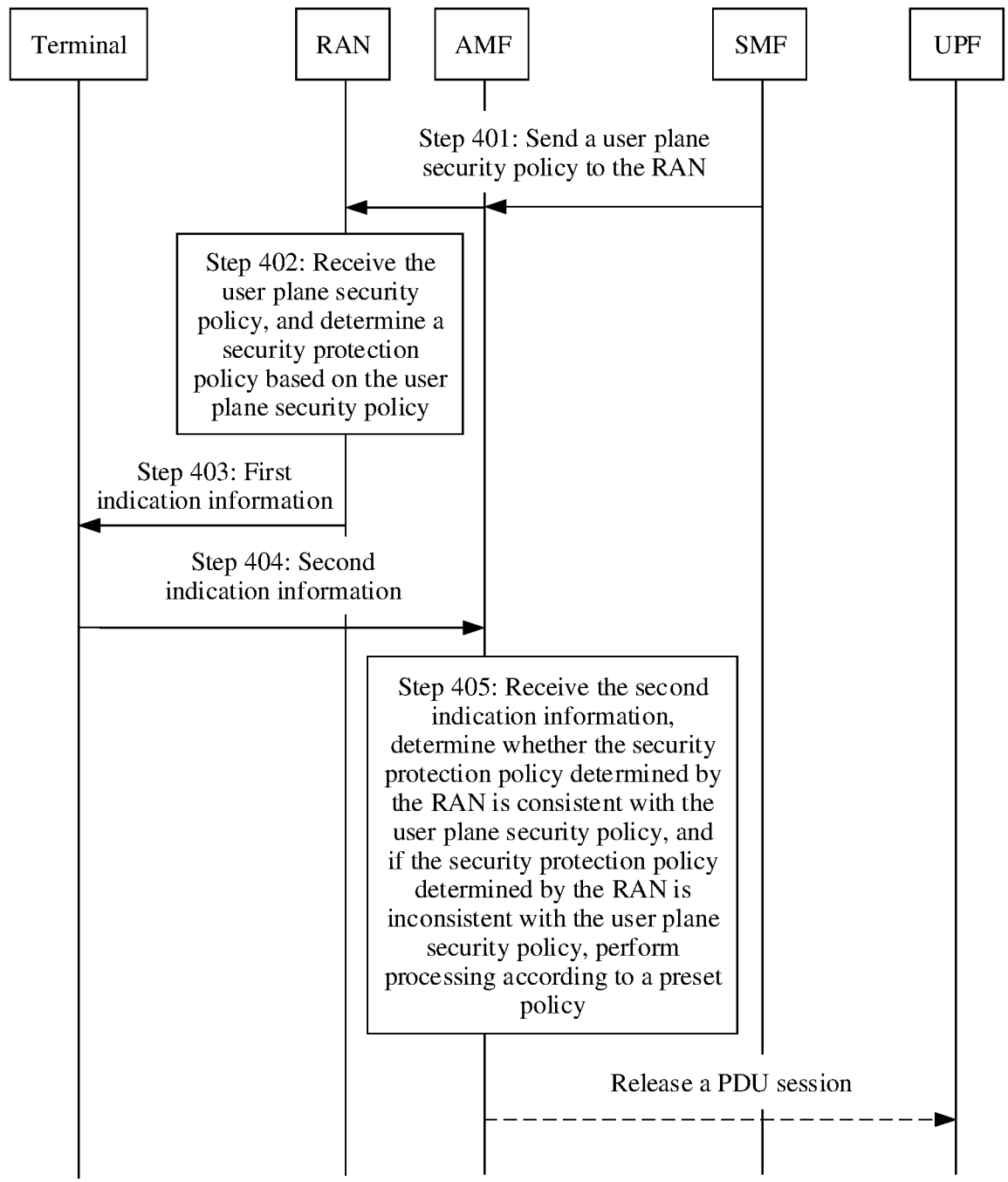
FIG. 4 is a flowchart of another security protection method according to an embodiment of this application.

FIG. 4 shows a security protection method according to an embodiment of this application. As shown in FIG. 4, the method may include the following steps.

Step 401: An SMF sends a user plane security policy to a RAN.

For step 401, refer to step 301.

Step 402: The RAN receives the user plane security policy, and determines a security protection policy based on the user plane security policy.

For step 402, refer to step 302.

Step 403: The RAN sends first indication information to a terminal.

For related descriptions of the first indication information and a process of performing step 403, refer to step 303.

Step 404: The terminal receives the first indication information, and sends second indication information to an AMF.

For related descriptions of the second indication information, refer to step 304.

Optionally, the terminal may send an N1 message including the second indication information to the AMF. Alternatively, the terminal sends the second indication information to the RAN. After receiving the second indication information, the RAN sends an N2 message including the second indication information to the AMF.

Optionally, if the terminal further receives the PDU session ID in addition to the first indication information, the terminal may further send the PDU session ID to the AMF in addition to the second indication information, so that the AMF determines, based on the PDU session ID, that the second indication information is related to the PDU session identified by the PDU session ID, that is, the security protection policy indicated by the second indication information is used to specify whether data protection is enforced on data transmitted on the PDU session.

Step 405: The AMF receives the second indication information, and determines whether the security protection policy determined by the RAN is consistent with the user plane security policy. If the security protection policy determined by the RAN is inconsistent with the user plane security policy, the AMF performs processing according to a preset policy.

That the AMF determines whether the security protection policy determined by the RAN is consistent with the user plane security policy may be further described as follows: The AMF determines whether the second indication information is consistent with the user plane security policy. Alternatively, the AMF determines whether the security protection policy indicated by the second indication information is consistent with the user plane security policy.

Optionally, the AMF may determine, based on the PDU session ID received from the terminal, a user plane security policy corresponding to the PDU session ID, and further determine whether the security protection policy indicated by the second indication information is consistent with the user plane security policy corresponding to the PDU session ID. For a process of determining, by the AMF, whether the security protection policy determined by the RAN is consistent with the user plane security policy, refer to step 305.

In this embodiment of this application, security measures taken by the AMF may also include one or more of the following (1) to (4).

(1) Release the PDU session. For example, the AMF sends an N4 session link release request to the SMF. After receiving the N4 link release request, the SMF sends the N4 session release request to a UPF, to request to release the PDU session, and sends a session release instruction including the PDU session ID to the AMF, to indicate the AMF not to transmit data on the PDU session. Optionally, the AMF sends a determined result to the terminal, so that the terminal triggers a PDU session release procedure. Optionally, the AMF sends a determined result to the SMF, so that the SMF triggers a PDU session release procedure.

(2) Report a notification message to another network element. The notification message may be used to indicate that a check on the user plane security policy is abnormal, the RAN may be attacked, or the user plane security policy is tampered with. For example, the AMF may report the notification message to the AMF, a management network element, or an O&M, to notify the network element that a check on the user plane security policy is abnormal, the RAN may be attacked, or the user plane security policy is tampered with.

(3) Trigger a PDU session modification and resend the user plane security policy to the RAN. For example, the AMF may send, to the terminal, a determined result that the security protection policy determined by the RAN is inconsistent with the user plane security policy delivered by the SMF. After receiving the determined result, the terminal may send a PDU session modification request to the AMF. After receiving the PDU session modification request, the AMF may send an SM context modification request to the SMF. After receiving the SM context modification request, the SMF resends the user plane security policy to the RAN, that is, performs step 401 again. Alternatively, the AMF may directly trigger a PDU session modification procedure. Specifically, a manner of triggering the PDU session modification procedure by the AMF is not limited in embodiments of the present disclosure. Optionally, the AMF sends the determined result to the SMF, so that the SMF triggers the PDU session modification. For example, in a new PDU session modification procedure, the SMF sends the user plane security policy stored in the SMF to a gNB.

(4) The AMF may send, to the SMF, the determined result that the security protection policy determined by the RAN is inconsistent with the user plane security policy, so that the SMF performs any one or more of the security measures (1) to (3) in step 305.

In addition, optionally, if the security protection policy determined by the RAN is completely consistent with the user plane security policy, the AMF may perform no processing.

According to the method shown in FIG. 4, the terminal may send, to the AMF, the indication information used to indicate the security protection policy determined by the RAN. The AMF determines whether the security protection policy determined by the RAN is consistent with the user plane security policy. When the security protection policy determined by the RAN is inconsistent with the user plane security policy, the AMF may perform processing according to the preset policy, to improve subsequent data transmission security. In this case, even if the security protection policy determined by the RAN is incorrect, a network-side device can know that, and take a corresponding remedy.

Optionally, in another possible implementation of the method shown in FIG. 4, in step 402, when the user plane security policy received by the RAN is not tampered with or the RAN does not maliciously refuse to enforce data protection, and the confidentiality protection indication and/or the integrity protection indication in the user plane security policy correspond/corresponds to "required", after receiving the user plane security policy, the RAN may determine, with reference to information such as a resource or a capability of the RAN, whether data protection is enforced. If the RAN determines that data protection cannot be enforced, the RAN may send a rejection message to the AMF, to notify the AMF not to enforce data protection.

After receiving the rejection message, the AMF may release the PDU session.

Further optionally, after receiving the rejection message, the AMF may further maintain a counter. The counter is used to count a quantity of received rejection messages sent by the RAN. For example, if the AMF receives one rejection message, a count value of the counter is increased by 1. When the count value of the counter maintained by the AMF is greater than or equal to a preset quantity of times, the AMF reports a notification message to another network element. The notification message may be used to notify the network element that the RAN is abnormal, the RAN may be attacked, or the like. For example, the AMF may report the notification message to the SMF, a management network element, or an O&M.

Alternatively, the AMF calculates a rejection frequency of the RAN. If the rejection frequency of the RAN is greater than or equal to a preset frequency, the AMF reports a notification message to another network element. The notification message may be used to indicate that the RAN is abnormal, the RAN may be attacked, or the like. For example, the AMF may report the notification message to the SMF, a management network element, or an O&M.

The preset quantity of times may be set based on a requirement. This is not limited in embodiments of the present disclosure. When the count value of the counter is greater than or equal to the preset quantity of times, it indicates that the RAN is abnormal or the RAN may be attacked. When the count value of the counter is less than the preset quantity of times, it indicates that the RAN is normal.

The rejection frequency may be a quantity of rejection messages sent by the RAN to the SMF per unit of time. The preset frequency may be set based on a requirement. This is not limited in embodiments of the present disclosure. When the rejection frequency of the RAN is greater than or equal to the preset frequency, it indicates that the RAN is abnormal or the RAN may be attacked. When the rejection frequency of the RAN is less than the preset frequency, it indicates that the RAN is normal.

In another feasible solution, the terminal may further determine, based on the first indication information and the user plane security policy, whether the security protection policy determined by the RAN is consistent with the user plane security policy. Specifically, the method is shown in FIG. 5.

Figure 5:
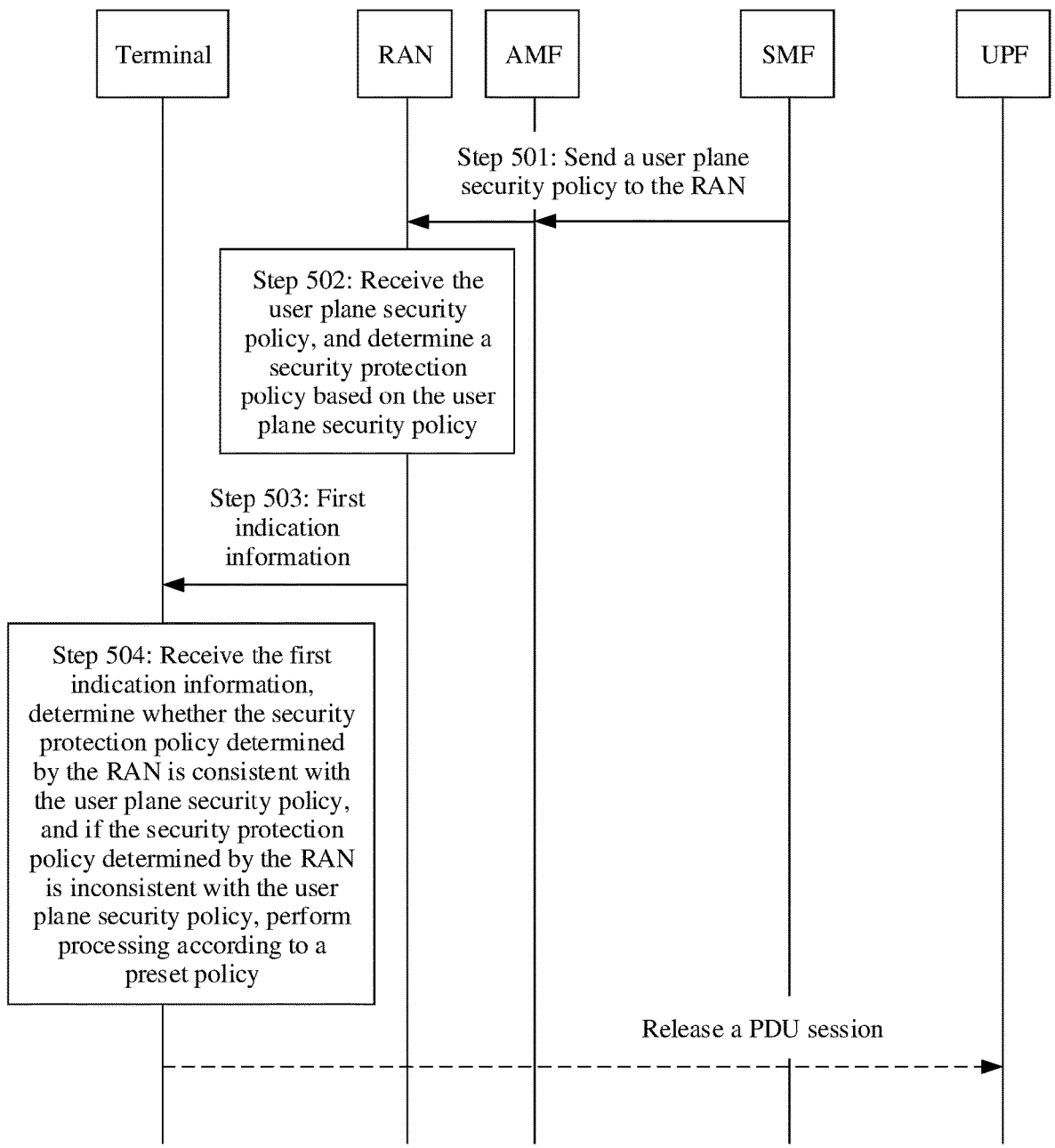
FIG. 5 is a flowchart of yet another security protection method according to an embodiment of this application.

FIG. 5 shows a security protection method according to an embodiment of this application. As shown in FIG. 5, the method may include the following steps.

Step 501: An SMF sends a user plane security policy to a RAN, and sends the user plane security policy to a terminal.

For a process of sending the user plane security policy by the SMF to the RAN in step 501, refer to step 301.

That an SMF sends the user plane security policy to a terminal may include: The SMF directly sends the user plane security policy to UE by using the AMF and the RAN. Alternatively, the SMF sends the user plane security policy to the AMF, and the AMF sends a non-access stratum NAS message including the user plane security policy to the terminal. Alternatively, the SMF sends the user plane security policy to the RAN, and after receiving the user plane security policy, the RAN sends the user plane security policy to the terminal.

Optionally, if the user plane security policy corresponds to the PDU session, when sending the user plane security policy to the RAN by using the AMF, the SMF may further send a PDU session ID to the RAN, so that the RAN determines, based on the PDU session ID, that the received user plane security policy corresponds to the PDU session, that is, the user plane security policy is applicable to the PDU session.

The SMF may further send the PDU session ID to the terminal in addition to the user plane security policy, so that the terminal determines, based on the PDU session ID, that the user plane security policy is related to the PDU session identified by the PDU session ID, that is, a security protection policy indicated by the user plane security policy is used to specify whether data protection is enforced on data transmitted on the PDU session.

Step 502: The RAN receives the user plane security policy, and determines a security protection policy based on the user plane security policy.

For step 502, refer to step 302.

Step 503: The RAN sends first indication information to the terminal.

For related descriptions of the first indication information and a process of performing step 503, refer to step 303.

Optionally, if the RAN further receives the PDU session ID in addition to the user plane security policy, the RAN may further send the PDU session ID to the terminal in addition to the first indication information, so that the terminal determines, based on the PDU session ID, that the first indication information is related to the PDU session identified by the PDU session ID, that is, the security protection policy indicated by the first indication information is used to specify whether data protection is enforced on data transmitted on the PDU session.

Step 504: The terminal receives the first indication information, and determines whether the security protection policy determined by the RAN is consistent with the user plane security policy. If the security protection policy determined by the RAN is inconsistent with the user plane security policy, the terminal performs processing according to a preset policy.

That the terminal determines whether the security protection policy determined by the RAN is consistent with the user plane security policy may be further described as follows: The terminal determines whether the first indication information is consistent with the user plane security policy. Alternatively, the terminal determines whether the security protection policy indicated by the first indication information is consistent with the user plane security policy.

Optionally, the terminal may determine, based on the PDU session ID received from the SMF, a user plane security policy corresponding to the PDU session ID, and further determine whether the security protection policy indicated by the first indication information is consistent with the user plane security policy corresponding to the PDU session ID. For a process of determining, by the terminal, whether the security protection policy determined by the RAN is consistent with the user plane security policy, refer to step 305.

In this embodiment of this application, security measures taken by the terminal may also include one or more of the following (1) to (3).

(1) Trigger a PDU session modification. For example, the terminal may send a PDU session modification request to the AMF. After receiving the PDU session modification request, the AMF may send an SM context modification request to the SMF. After receiving the SM context modification request, the SMF resends the user plane security policy to the RAN, that is, performs the process of sending the user plane security policy by the SMF to the RAN in step 501 again.

(2) The terminal may send, to the SMF, a determined result that the security protection policy determined by the RAN is inconsistent with the user plane security policy, so that the SMF performs any one or more of the security measures (1) to (3) in step 305. For example, the terminal may send, to the SMF, a determined result used to indicate that a first integrity protection indication is inconsistent with an integrity protection indication in the user plane security policy and/or a determined result used to indicate that a first confidentiality protection indication is inconsistent with a confidentiality protection indication in the user plane security policy. That a first integrity protection indication is inconsistent with an integrity protection indication in the user plane security policy may include: The integrity protection indication in the user plane security policy corresponds to "required", and the first integrity protection indication corresponds to "not enforce". Alternatively, the integrity protection indication in the user plane security policy corresponds to "not need", and the first integrity protection indication corresponds to "enforce". Similarly, that a first confidentiality protection indication is inconsistent with a confidentiality protection indication in the user plane security policy may include: The confidentiality protection indication in the user plane security policy corresponds to "required", and the first confidentiality protection indication corresponds to "not enforce". Alternatively, the confidentiality protection indication in the user plane security policy corresponds to "not need", and the first confidentiality protection indication corresponds to "enforce".

It should be noted that, when the terminal receives the PDU session ID sent by the RAN, the terminal may further send the PDU session ID to the SMF in addition to the determined result, so that the SMF determines, based on the PDU session ID, that the determined result is related to the PDU session identified by the PDU session ID, and the SMF releases the PDU session or takes another measure.

(3) The terminal may send, to the AMF, the determined result that the security protection policy determined by the RAN is inconsistent with the user plane security policy, so that the AMF performs any one or more of the security measures (1) to (4) in step 405. It should be noted that, when the terminal receives the PDU session ID sent by the RAN, the terminal may further send the PDU session ID to the AMF in addition to the determined result, so that the AMF determines, based on the PDU session ID, that the determined result is related to the PDU session identified by the PDU session ID, and the AMF releases the PDU session or takes another measure.

(4) The terminal triggers a PDU session release procedure. Optionally, the terminal sends the determined result to the AMF, so that the AMF triggers the PDU session release procedure. Optionally, the terminal sends the determined result to the SMF, so that the SMF triggers the PDU session release procedure.

In addition, optionally, if the security protection policy determined by the RAN is completely consistent with the user plane security policy, the terminal may perform no processing. Alternatively, the terminal sends, to the SMF, a determined result that the security protection policy determined by the RAN is completely consistent with the user plane security policy.

According to the method shown in FIG. 5, the terminal may determine, based on the first indication information and the user plane security policy, whether the security protection policy determined by the RAN is consistent with the user plane security policy. When the security protection policy determined by the RAN is inconsistent with the user plane security policy, the terminal may perform processing according to the preset policy, to improve subsequent data transmission security. In this case, even if the security protection policy determined by the RAN is incorrect, a network-side device can know that, and take a corresponding remedy.

It should be noted that the foregoing embodiments are merely described by using an example in which the user plane security policy corresponds to the PDU session. Optionally, if the user plane security policy corresponds to a QoS flow, a DRB, a slice identifier, or an N3 tunnel identifier, the PDU session ID in the foregoing embodiments may be replaced with a quality of service flow identifier (QFI), a DRB ID, a slice identifier, an N3 tunnel identifier, or the like. This is not limited in embodiments of the present disclosure.

It should be noted that the foregoing embodiments are merely described by using an example in which the RAN sends the first indication information to the terminal. Alternatively, there may be the following case: The RAN may directly send the security protection policy determined by the RAN to the terminal, so that the terminal determines whether the security protection policy is consistent with the user plane security policy, or the terminal sends the received security protection policy to another network element, to help the other network element determine whether the security protection policy is consistent with the user plane security policy.

The foregoing mainly describes the solutions provided in the embodiments of this application from a perspective of interaction between the network elements. It may be understood that, to implement the foregoing functions, the terminal and the user plane network element include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal and the user plane network element may be divided into functional modules based on the foregoing method examples. For example, each functional module may be obtained through division based on a corresponding function, or at least two functions may be integrated into one processing module. The integrated module may be implemented in a form of hardware, or may be implemented in a form of a software functional module. It should be noted that, in the embodiments of this application, module division is an example, and is merely a logical function division. In an actual implementation, another division manner may be used.

Figure 6:
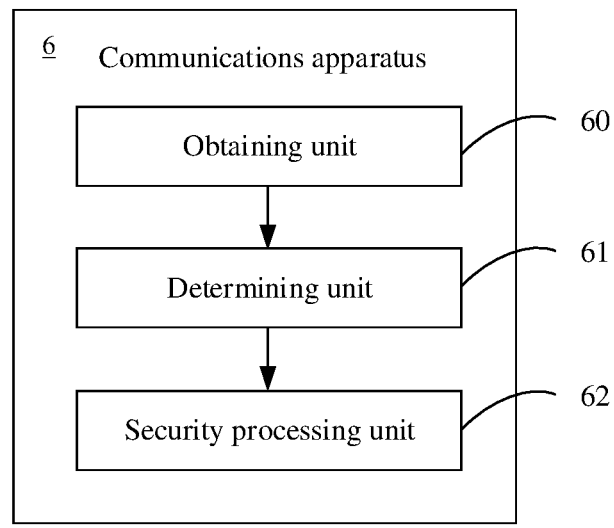
FIG. 6 is a block diagram of a communications apparatus according to an embodiment of this application.

FIG. 6 is a schematic block diagram of a communications apparatus 6. The communications apparatus 6 may be a terminal, a chip in a terminal, or a system on chip, or may be an SMF, a chip in an SMF, or a system on chip, or may be an AMF, a chip in an AMF, or a system on chip. The communications apparatus 6 may be configured to perform a function of the SMF in the security protection method shown in FIG. 3, or configured to perform a function of the AMF in the security protection method shown in FIG. 4, or configured to perform a function of the terminal in the security protection method shown in FIG. 5. In an implementation, the communications apparatus 6 shown in FIG. 6 includes an obtaining unit 60, a determining unit 61, and a security processing unit 62.

The obtaining unit 60 is configured to obtain indication information used to indicate a security protection policy determined by an access network device. For example, when the communications apparatus shown in FIG. 6 is the SMF, the obtaining unit 60 may support the communications apparatus shown in FIG. 6 in performing step 305. When the communications apparatus shown in FIG. 6 is the AMF, the obtaining unit 60 may support the communications apparatus shown in FIG. 6 in performing step 405. When the communications apparatus shown in FIG. 6 is the terminal, the obtaining unit 60 may support the communications apparatus shown in FIG. 6 in performing step 504.

The determining unit 61 is configured to determine whether the security protection policy determined by the access network device is consistent with a user plane security policy. For example, when the communications apparatus shown in FIG. 6 is the SMF, the determining unit 61 may support the communications apparatus shown in FIG. 6 in performing step 305. When the communications apparatus shown in FIG. 6 is the AMF, the determining unit 61 may support the communications apparatus shown in FIG. 6 in performing step 405. When the communications apparatus shown in FIG. 6 is the terminal, the determining unit 61 may support the communications apparatus shown in FIG. 6 in performing step 504.

The security processing unit 62 is configured to: if the security protection policy determined by the access network device is inconsistent with the user plane security policy, perform processing according to a preset policy. For example, when the communications apparatus shown in FIG. 6 is the SMF, the security processing unit 62 may support the communications apparatus shown in FIG. 6 in performing step 305. When the communications apparatus shown in FIG. 6 is the AMF, the security processing unit 62 may support the communications apparatus shown in FIG. 6 in performing step 405. When the communications apparatus shown in FIG. 6 is the terminal, the security processing unit 62 may support the communications apparatus shown in FIG. 6 in performing step 504.

It should be noted that all related content of the steps in the foregoing method embodiments may be cited in function descriptions of corresponding function modules. The communications apparatus 6 provided in this embodiment of this application is configured to perform the function of the SMF in the security protection method shown in FIG. 3, or configured to perform the function of the AMF in the security protection method shown in FIG. 4, or configured to perform the function of the terminal in the security protection method shown in FIG. 5. Therefore, same effects as the foregoing security protection method can be achieved.

In another implementation, the communications apparatus 6 shown in FIG. 6 may include a processing module and a communications module. A function of the determining unit 61 and a function of the security processing unit 62 may be integrated into the processing module, and a function of the obtaining unit 60 may be integrated into the communications module. The processing module is configured to control and manage an action of the communications apparatus 6. For example, the processing module is configured to support the communications apparatus 6 in performing step 305, step 405, and step 504, and in performing another process of the technology described in this specification. The communications module is configured to support the communications apparatus 6 in communicating with another network entity. Further, the communications apparatus 6 may further include a storage module, configured to store program code and data for the communications apparatus 6.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus shown in FIG. 6 may be the communications apparatus shown in FIG. 2.

Figure 7:
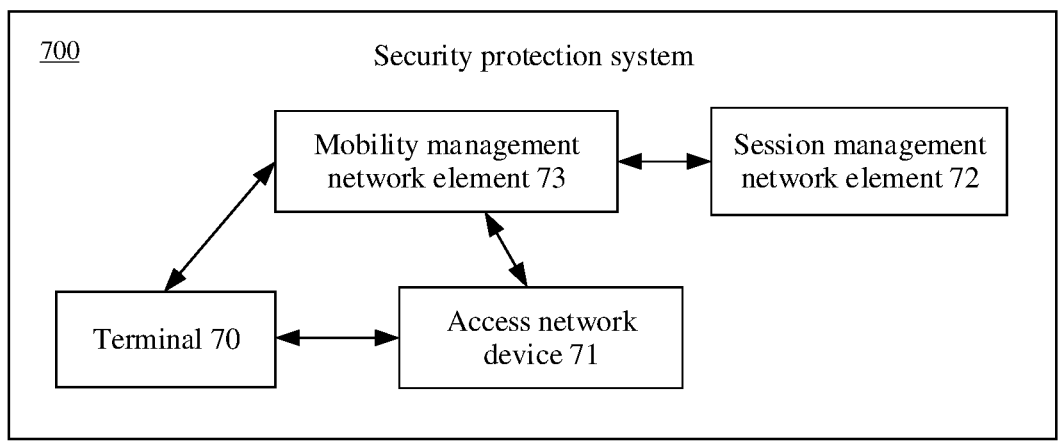
FIG. 7 is a block diagram of a security protection system according to an embodiment of this application.

FIG. 7 is a schematic block diagram of a security protection system 700. As shown in FIG. 7, the security protection system 700 may include a terminal 70, an access network device 71, a session management network element 72, and a mobility management network element 73.

The terminal 70, the session management network element 72, or the mobility management network element 73 has a function of the communications apparatus shown in FIG. 6, and may be configured to: obtain indication information used to indicate a security protection policy determined by the access network device 71, determine whether the security protection policy determined by the access network device 71 is consistent with a user plane security policy, and if the security protection policy determined by the access network device 71 is inconsistent with the user plane security policy, perform processing according to a preset policy.

It should be noted that all related content of the steps in the foregoing method embodiments may be cited in function descriptions of network elements corresponding to the security protection system.

Based on the security protection system 700, the terminal 70, the mobility management network element 73, or the session management network element 72 may determine whether the security protection policy determined by the access network device 71 is consistent with the user plane security policy. When the security protection policy determined by the access network device 71 is inconsistent with the user plane security policy, it indicates that the user plane security policy received by the access network device 71 may be tampered with or the access network device 71 may maliciously refuse to enforce data protection. In this case, the terminal 70, the mobility management network element 73, or the session management network element 72 may perform processing according to the preset policy, to improve subsequent data transmission security. In this case, even if the security protection policy determined by the access network device 71 is incorrect, a network-side device can know that, and take a corresponding remedy.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. Throughout this specification, when a feature is described as "comprising" an element or a step, unless otherwise described, another element or another step may be further included, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A security protection method, comprising:
 obtaining, by a first device, indication information, wherein the indication information indicates a security protection policy determined by an access network device;
 determining, by the first device, whether the security protection policy determined by the access network device is consistent with a user plane security policy; and
 upon determination that the security protection policy determined by the access network device is inconsistent with the user plane security policy, performing, by the first device, processing according to a preset policy.

2. The method according to claim 1, wherein the first device is a terminal, and the performing, by the first device, processing according to a preset policy comprises:
 reporting, by the first device, a determined result to a core network element, the determined result indicating that the security protection policy determined by the access network device is inconsistent with the user plane security policy; or
 requesting, by the first device, a session management network element to re-deliver the user plane security policy to the access network device.

3. The method according to claim 2, further comprising:
 receiving, by the terminal, the user plane security policy sent by the session management network element by using a mobility management network element.

4. The method according to claim 1, wherein the first device is a session management network element, and the obtaining, by a first device, indication information comprises:
 receiving, by the first device, the indication information from a terminal.

5. The method according to claim 4, wherein the performing, by the first device, processing according to a preset policy comprises:
 releasing, by the first device, a protocol data unit session (PDU) session; or
 resending, by the first device, the user plane security policy to the access network device.

6. A communications apparatus, wherein the communications apparatus comprises:
 an obtaining unit, configured to obtain indication information, wherein the indication information indicates a security protection policy determined by an access network device;
 a determining unit, configured to determine whether the security protection policy determined by the access network device is consistent with a user plane security policy; and
 a security processor, configured to: upon determination that the security protection policy determined by the access network device is inconsistent with the user plane security policy, perform processing according to a preset policy.

7. The communications apparatus according to claim 6, wherein the communications apparatus is a terminal, and the security processor is further configured to:
 report a determined result to a core network element, the determined result indicating that the security protection policy determined by the access network device is inconsistent with the user plane security policy; or
 request a session management network element to re-deliver the user plane security policy to the access network device.

8. The communications apparatus according to claim 7, wherein
 the obtaining unit is further configured to receive the user plane security policy sent by the session management network element by using a mobility management network element.

9. The communications apparatus according to claim 6, wherein the communications apparatus is a session management network element, and the obtaining unit is further configured to:
 receive the indication information from a terminal.

10. The communications apparatus according to claim 9, wherein the security processor is further configured to:
 release a protocol data unit session (PDU) session; or
 resend the user plane security policy to the access network device.

11. A communications apparatus comprising:
 at least one processor; and
 a memory configured to store computer readable instructions that, when executed by the at least one processor, cause the communications apparatus to provide execution comprising:

obtaining indication information indicating a security protection policy determined by an access network device;

determining whether the security protection policy determined by the access network device is consistent with a user plane security policy; and upon determination that the security protection policy determined by the access network device is inconsistent with the user plane security policy, performing processing according to a preset policy.

12. The communications apparatus according to claim 11, wherein the communications apparatus is a terminal, and the processing according to the preset policy comprises:

reporting a determined result to a core network element, the determined result indicating that the security protection policy determined by the access network device is inconsistent with the user plane security policy; or requesting a session management network element to re-deliver the user plane security policy to the access network device.

13. The communications apparatus according to claim 12, the execution provided by the communication apparatus further comprises:

receiving the user plane security policy sent by the session management network element by using a mobility management network element.

14. The communications apparatus according to claim 11, wherein the communications apparatus is a session management network element, and the obtaining indication information comprises:

receiving the indication information from a terminal.

15. The communications apparatus according to claim 14, wherein the processing according to the preset policy comprises:

releasing a protocol data unit session (PDU) session; or resending the user plane security policy to the access network device.

16. The communications apparatus according to claim 11, wherein the security protection policy is determined by the access network device based on the user plane security policy, the access network device receives the user plane security policy from a session management network element.

17. The communications apparatus according to claim 11, wherein the security protection policy is determined by the access network device based on a revised user plane security policy, the revised user plane security policy is different from the user plane security policy received by the access network device from a session management network element.

18. A non-transitory computer-readable storage medium encoded with a computer program, the program comprising instructions that, when executed by a communications apparatus, cause the communications apparatus to perform operations comprising:

obtaining indication information, wherein the indication information indicates a security protection policy determined by an access network device;

determining whether the security protection policy determined by the access network device is consistent with a user plane security policy; and upon determination that the security protection policy determined by the access network device is inconsistent with the user plane security policy, performing processing according to a preset policy.

19. The method according to claim 1, wherein the user plane security policy comprises indication information specifying whether data protection needs to be enforced on a protocol data unit session, data transmitted on a data radio bearer, or data belonging to a quality of service flow.

20. The method according to claim 1, wherein the user plane security policy comprises information indicating integrity protection and/or information indicating confidentiality protection.

21. The method according to claim 20, wherein the determination of whether the security protection policy determined by the access network device is consistent with the user plane security policy comprises: determining whether the information indicating integrity protection and/or the information indicating confidentiality protection is consistent with corresponding information in the security protection policy.

* * * * *